United States Patent
Wang et al.

(10) Patent No.: US 12,515,986 B1
(45) Date of Patent: Jan. 6, 2026

(54) POLYETHYLENE (PE) WASTE MATERIAL-BASED CARBON-FIXED AGGREGATE WITH WIRE MESH SHELL, AND PREPARATION METHOD OF PE WASTE MATERIAL-BASED CARBON-FIXED AGGREGATE

(71) Applicant: Inner Mongolia Agricultural University, Hohhot (CN)

(72) Inventors: Hailong Wang, Hohhot (CN); Xiaoxiao Wang, Hohhot (CN)

(73) Assignee: INNER MONGOLIA AGRICULTURAL UNIVERSITY, Hohhot (CN)

( * ) Notice: Subject to any disclaimer, the term of this patent is extended or adjusted under 35 U.S.C. 154(b) by 0 days.

(21) Appl. No.: 19/023,292

(22) Filed: Jan. 16, 2025

(30) Foreign Application Priority Data

Sep. 20, 2024 (CN) .......................... 202411317763.9

(51) Int. Cl.
| | | |
|---|---|---|
| *C04B 18/02* | (2006.01) | |
| *B01D 53/02* | (2006.01) | |
| *B01J 20/10* | (2006.01) | |
| *B09B 3/27* | (2022.01) | |
| *B09B 3/29* | (2022.01) | |
| *B09B 3/38* | (2022.01) | |
| *B09B 3/40* | (2022.01) | |
| *C04B 20/02* | (2006.01) | |
| *C04B 20/04* | (2006.01) | |
| *C04B 20/10* | (2006.01) | |
| *C04B 103/00* | (2006.01) | |
| *C04B 111/00* | (2006.01) | |
| *B09B 101/75* | (2022.01) | |

(52) U.S. Cl.
CPC ............ *C04B 18/022* (2013.01); *B01D 53/02* (2013.01); *B01J 20/10* (2013.01); *B09B 3/27* (2022.01); *B09B 3/29* (2022.01); *B09B 3/38* (2022.01); *B09B 3/40* (2022.01); *C04B 20/023* (2013.01); *C04B 20/04* (2013.01); *C04B 20/1077* (2013.01); *B01D 2253/106* (2013.01); *B01D 2257/504* (2013.01); *B09B 2101/75* (2022.01); *C04B 2103/0078* (2013.01); *C04B 2111/00017* (2013.01); *C04B 2111/00784* (2013.01)

(58) Field of Classification Search
CPC ............................................ C04B 18/02–028
See application file for complete search history.

(56) References Cited

U.S. PATENT DOCUMENTS

| 4,624,711 A | * | 11/1986 | Styron ................. C04B 18/027 |
|---|---|---|---|
| | | | 106/DIG. 1 |
| 2010/0144521 A1 | * | 6/2010 | Constantz ................. C01F 5/24 |
| | | | 423/430 |

FOREIGN PATENT DOCUMENTS

| CN | 117903758 A | 4/2024 |
|---|---|---|
| CN | 117964272 A | 5/2024 |
| CN | 118084430 A | 5/2024 |
| DE | 19735063 A1 | 2/1999 |

* cited by examiner

*Primary Examiner* — Stephen E Rieth
(74) *Attorney, Agent, or Firm* — Bayramoglu Law Offices LLC (57) ABSTRACT

A PE waste material-based carbon-fixed aggregate with a wire mesh shell, and a preparation method of the PE waste material-based carbon-fixed aggregate are provided. The preparation method includes the following steps: S1, pre-treatment of a PE material collected; S2, carbon fixation for a pumice to produce a carbon-fixed pumice; S3, preparation of a powder-adsorbed pumice; S4, high-temperature calcination to form a wire mesh shell skeleton; and S5, post-treatment. By providing the PE waste material-based carbon-fixed aggregate with the wire mesh shell and the preparation method of the PE waste material-based carbon-fixed aggregate, achieving the comprehensive and effective recycling of waste agricultural mulch films and drip irrigation belts while solving the problems that pervious concrete is susceptible to water erosion and aggregates have poor carbon fixation and sequestration effects.

7 Claims, 2 Drawing Sheets

POLYETHYLENE (PE) WASTE MATERIAL-BASED CARBON-FIXED AGGREGATE WITH WIRE MESH SHELL, AND PREPARATION METHOD OF PE WASTE MATERIAL-BASED CARBON-FIXED AGGREGATE

CROSS REFERENCE TO THE RELATED APPLICATIONS

This application is based upon and claims priority to Chinese Patent Application No. 202411317763.9, filed on Sep. 20, 2024, the entire contents of which are incorporated herein by reference.

TECHNICAL FIELD

The present application relates to the technical field of recycling of agricultural waste polyethylene (PE) materials, and in particular relates to a PE waste material-based carbon-fixed aggregate with a wire mesh shell, and a preparation method of the PE waste material-based carbon-fixed aggregate.

BACKGROUND

In the seasonal cold and arid areas, water resources are precious. Currently, pervious concrete is widely used in engineering fields such as ecological slope protection, landscape greening, municipal sidewalks, and ecological agricultural landscape roads due to the fact that the rainwater infiltration can be well formed by pervious concrete to allow the effective groundwater recharge. In addition, as one of the manufacturing materials for pervious concrete, pumice has a pore structure with a specified carbon fixation ability, which can improve the performance of an aggregate itself while avoiding the dioxide carbon emission through carbon mineralization. However, in the current application process, on the one hand, the long-term water erosion aggravates the damage to pervious concrete in use, resulting in a seriously insufficient service life. On the other hand, because a pumice-based pervious concrete aggregate has an open pore structure, when $CO_2$ is absorbed, some $CO_2$ attachments float on the surface of aggregates. In a secondary mixing and preparation process, the $CO_2$ attachments fall off due to the mutual friction between aggregates, resulting in a carbon loss after carbon fixation and a limited fixed carbon amount.

Inner Mongolia is a key area for the use of agricultural mulch films in China, with characteristics such as large consumption, wide coverage, and many mulched crops. The promotion of water-saving irrigation year by year has greatly increased the application of agricultural drip irrigation belts. There is insufficient recycling of waste agricultural mulch films and drip irrigation belts accordingly. According to incomplete statistics, the effective recycling rate currently for mulch films and drip irrigation belts is less than ¹⁄₁₀, and a large number of waste mulch films and drip irrigation belts are discarded and piled up at will.

The current recycling of waste mulch films and drip irrigation belts usually includes recovery, regeneration, and use of a treated material in the manufacture of a plastic product. However, the recovery and regeneration require advanced techniques and devices to ensure that the recovered materials can meet the quality standards for reuse, which increases the cost of recycling and brings the additional burden. Therefore, the present application is intended to provide a carbon-fixed aggregate. The present application effectively improves the water erosion resistance of pervious concrete and the fixed carbon amount of the aggregate while effectively utilizing PE wastes such as waste mulch films and drip irrigation belts.

SUMMARY

The present application provides a PE waste material-based carbon-fixed aggregate with a wire mesh shell, and a preparation method of the PE waste material-based carbon-fixed aggregate. The present application achieves the comprehensive and effective recycling of waste agricultural mulch films and drip irrigation belts while solving the problems that pervious concrete is susceptible to water erosion and aggregates have poor carbon fixation and sequestration effects.

In a first aspect, the present application provides a preparation method of a PE waste material-based carbon-fixed aggregate with a wire mesh shell, including the following steps:

S1, pretreatment of a PE material collected:

S101, rinsing the PE material with water and cleaning with a detergent, and drying a cleaned PE material to produce a dried PE material, where the PE material includes a waste mulch film and a drip irrigation belt, and a mass ratio of the waste mulch film to the drip irrigation belt is 1.3:1;

S102, shredding the dried PE material to produce a shredded PE material with aside length and a diameter of less than 2 mm;

S103, thoroughly mixing the shredded PE material with a 1.2 mol/L dibutyl sebacate solution and a 0.8 mol/L epoxidized polyether solution, and feeding into a hot-melt extrusion granulator for granulation to produce spherical-like PE waste particles, where a mass of the dibutyl sebacate solution is 1.1% to 1.2% of a mass of the shredded PE material, and a mass of the epoxidized polyether solution is 0.8% to 1% of the mass of the shredded PE material;

S104, crushing the spherical-like PE waste particles into a PE waste powder with a particle size of 0.02 mm to 0.03 mm;

S2, carbon fixation for a pumice to produce a carbon-fixed pumice: placing the pumice in a carbon fixation machine, controlling the carbon fixation machine at a carbon dioxide concentration of 15%, a carbon fixation pressure of 1.01 KPa, and a rotational speed of 120 r/min, and conducting the carbon fixation for 3 h to produce the carbon-fixed pumice;

S3, preparation of a powder-adsorbed pumice:

spraying 0.7 parts to 0.9 parts of a sodium silicate solution with a concentration of 1% on a surface of 97 parts to 114 parts of the carbon-fixed pumice to produce a pretreated pumice; and thoroughly mixing 6.5 parts to 7.5 parts of the PE waste powder with 8.9 parts to 10.5 parts of a dispersant powder, and then mixing with 97.7 parts to 114.9 parts of the pretreated pumice, and treating in a gravity stirrer at a rotational speed of 120 r/min for 3 min to produce the powder-adsorbed pumice;

S4, high-temperature calcination to form a wire mesh shell skeleton:

S401, preheating: preheating the powder-adsorbed pumice at 120° C. to 130° C. for 3 min to 4 min;

S402, melting: 2 min later, continuously heating a pumice produced in the S401 at 150° C. to 170° C. for 4 min to 5 min to make a powder on a surface of the pumice melted;

S403, formation of the wire mesh shell skeleton: 2 min later, continuously heating a pumice produced in the S402 at 190° C. to 220° C. for 7 min to 9 min to form the wire mesh shell skeleton on a surface of the pumice; and S404, cooling: air-cooling a pumice with the wire mesh shell skeleton obtained in the S403 in an anaerobic environment for 20 min to produce the PE waste material-based carbon-fixed aggregate with the wire mesh shell; and S5, post-treatment: curing the PE waste material-based carbon-fixed aggregate with the wire mesh shell obtained in the S404 for 28 d under standard conditions, where the standard conditions are as follows: a temperature: 20±2° C., and a humidity: 95% or more.

Preferably, in the S101, the detergent is selected from one of Tween 80 or Triton X-100.

Preferably, in the S103, the hot-melt extrusion granulator has a barrel temperature of 160° C. to 180° C., a feeding speed and a screw speed of 80 rpm to 100 rpm, and a mesh plate size of 4 mm.

Preferably, in the S3, the dispersant powder has a particle size of 0.02 mm to 0.03 mm.

Preferably, in the S3, the dispersant powder includes a kaolin powder and a talcum powder, and a mass ratio of the kaolin powder to the talcum powder is 1:1.

Preferably, the preparation method further includes:
repeating the S1, the S3, and the S4 three times in total.

In a second aspect, the present application provides a PE waste material-based carbon-fixed aggregate with a wire mesh shell prepared by the preparation method of a PE waste material-based carbon-fixed aggregate with a wire mesh shell described above.

Beneficial effects of the technical solutions provided in the present application include:

The present application provides a PE waste material-based carbon-fixed aggregate with a wire mesh shell, and a preparation method of the PE waste material-based carbon-fixed aggregate, which have the following advantages:

(1) The PE waste powder prepared is calcined to form a wire mesh shell, so as to allow an effective secondary treatment for the carbon-fixed pumice aggregate, which can reduce a carbon loss after carbon fixation, achieve the purpose of locking a carbon fixation efficiency and strengthening and stabilizing a carbon fixation effect, and is conducive to improving the mechanical properties of the aggregate.

(2) Due to a large open porosity and specific surface area of a surface of the pumice, the use of the pumice as a substrate for wrapping and embedding can enhance a contact area between the pumice and the wire mesh shell formed after calcining the PE waste powder and improve a mechanical interaction force between the pumice and the wire mesh shell, resulting in firm bonding, uneasy fall-off, and effective carbon fixation.

(3) The wire mesh shell formed after calcining the PE waste powder has a hydrophobic surface. Thus, when the wire mesh shell is embedded in and wrapped around the aggregate, the internal dynamic erosion caused by water erosion for the aggregate can be effectively reduced, the performance of the aggregate can be improved, and the water erosion resistance and durability of a concrete can be optimized.

(4) The PE waste powder (plastic) has fluidity in a molten state, and the dispersant has a high melting point. Thus, the combination of the PE waste powder and the dispersant can present the "melting bridge" effect in a hot melting process. Through a plurality of wrapping+high-temperature hot-melting, the PE waste powder (plastic) can be controlled at a "melted" state and the dispersant can be controlled at a "dissolved but not melted" state by stages to form a spatial wire mesh structure, which can effectively improve a contact area of the spatial wire mesh structure with a surface of the aggregate to increase the cohesion between a slurry and the aggregate during a hardening process of pervious concrete and improve the performance of the aggregate.

(5) The preparation method provided in the present application can control a thickness of a wire mesh shell and a number of wire mesh shell layers by controlling a number of times for powder-adsorbed pumice preparation and high-temperature calcination, so as to prepare a flexible multilayer shell. The flexible multilayer shell is adsorbed on an aggregate to make the aggregate flexible, which can effectively improve the ductility, crack resistance, impact resistance, and freeze-thaw resistance of the aggregate.

(6) The preparation method provided in the present application can control a porosity of a wire mesh shell by controlling a particle size of the powder. During the high-temperature calcination, the powder is in a fluid state, and forms a film in a fluid state on the pretreated pumice. A separation capacity of the film is accurately controlled to increase the selectivity of the film for a specific substance, thereby improving the accuracy of a separation process and the filtration efficiency for a specific molecule or particle. A fluid flux of the film is controlled to optimize the passage speed and flow characteristics of a fluid.

(7) In the preparation method provided in the present application, a waste mulch film and a drip irrigation belt are recovered, granulated, and then prepared into a powder, and then the powder is adsorbed on a pumice porous medium with carbon fixed to lock a carbon fixation effect. After a plurality of adsorption treatments, the PE waste material can be effectively utilized. This special process can improve the performance of the aggregate, is conducive to environmental protection, resource conservation, and cost reduction, can promote the economic development, and can create employment opportunities.

BRIEF DESCRIPTION OF THE DRAWINGS

To describe the technical solutions in the embodiments of the present application clearly, the accompanying drawings required for describing the embodiments are briefly described below. Apparently, the accompanying drawings in the following description show merely some embodiments of the present application, and those of ordinary skill in the art may still derive other accompanying drawings from these accompanying drawings without creative efforts.

DETAILED DESCRIPTION OF THE EMBODIMENTS

In order to make the objectives, technical solutions, and advantages of the embodiments of the present application clear, the technical solutions in the embodiments of the present application are clearly and completely described below with reference to the accompanying drawings in the embodiments of the present application. Apparently, the described embodiments are some rather than all of the embodiments of the present application. All other embodiments obtained by those of ordinary skill in the art based on the embodiments of the present application without creative efforts should fall within the protection scope of the present application.

Figure 1:
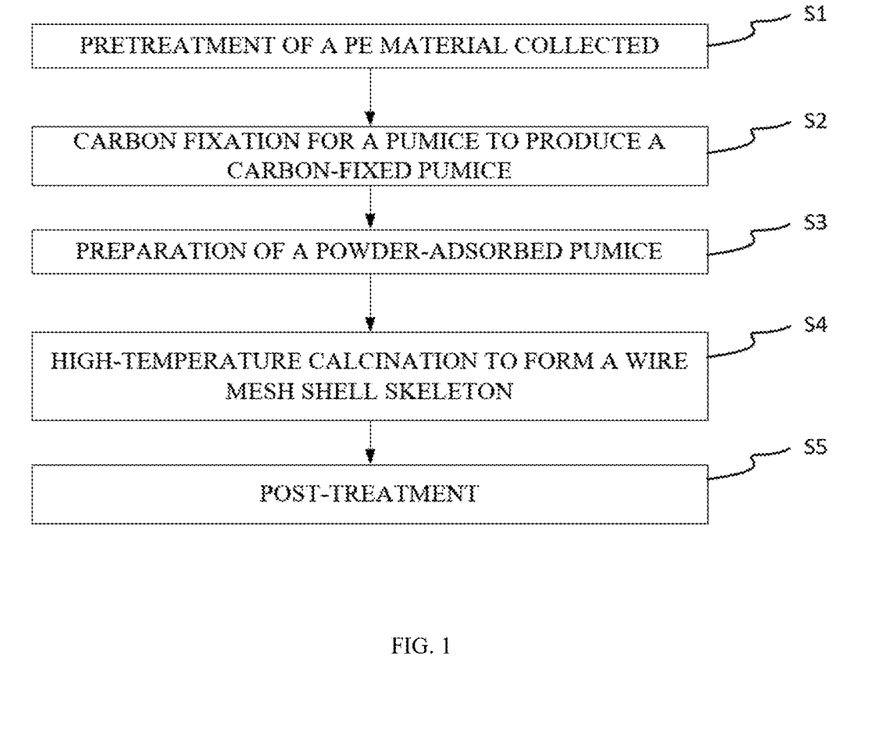
FIG. 1 is a flow chart of the preparation method of a PE waste material-based carbon-fixed aggregate with a wire mesh shell provided in the present application.
Figure 2:
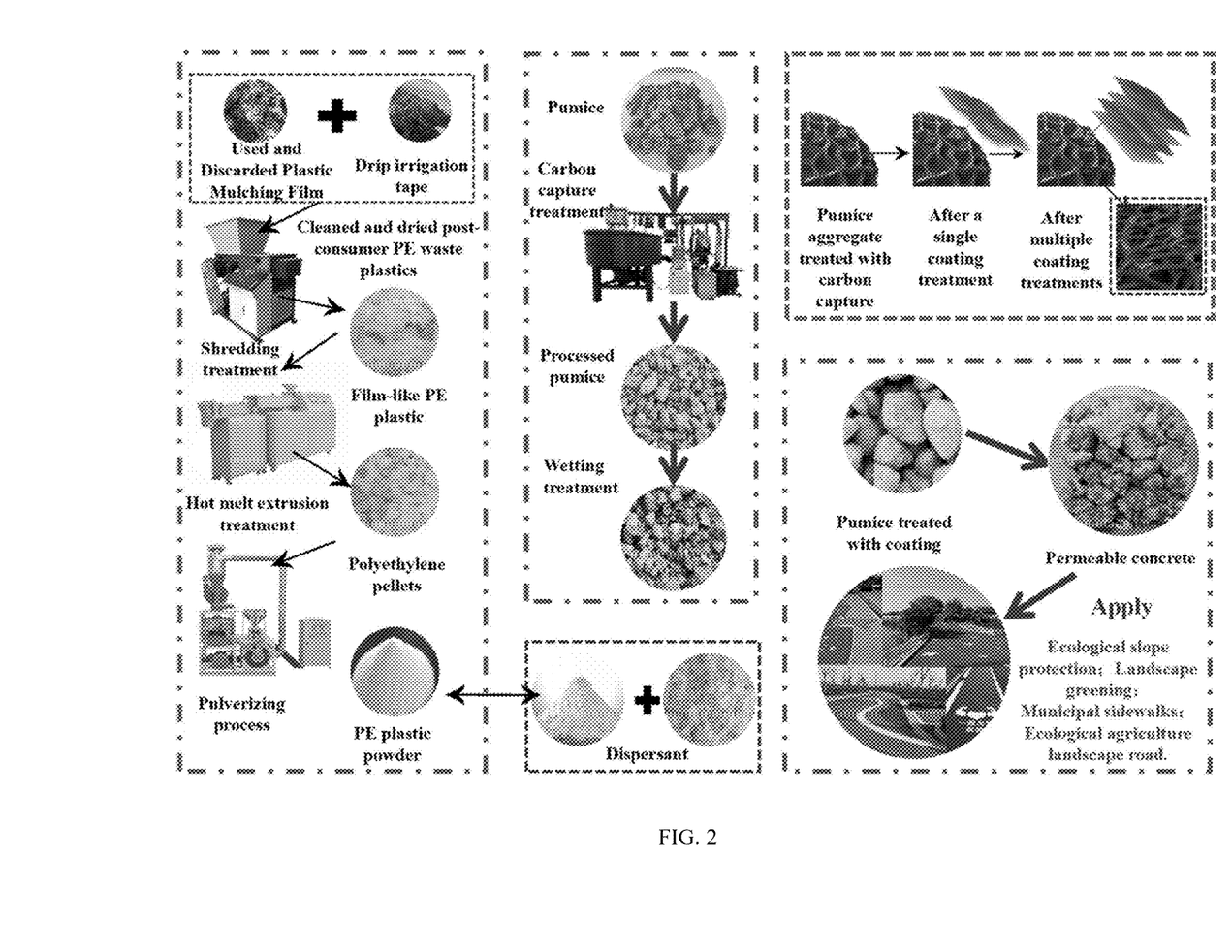
FIG. 2 is a schematic diagram of the preparation method of a PE waste material-based carbon-fixed aggregate with a wire mesh shell provided in the present application.

As shown in FIG. 1 and FIG. 2, the present application provides a preparation method of a PE waste material-based carbon-fixed aggregate with a wire mesh shell (referred to as carbon-fixed aggregate below), which can solve the problems that pervious concrete is susceptible to water erosion and a pumice aggregate has a low carbon fixation efficiency in related technologies, and also achieves the comprehensive and effective recycling of waste agricultural mulch films and drip irrigation belts. The preparation method included the following steps:

S1. Pretreatment of a PE material collected:

S101: The PE material is rinsed with water, then cleaned with a detergent, and then dried to produce a dried PE material. The PE material includes a waste mulch film and a drip irrigation belt, and a mass ratio of the waste mulch film to the drip irrigation belt is 1.3:1. Specifically, this step is conducted to remove soil, plant residues, and impurities attached to surfaces of the waste mulch film and the drip irrigation belt.

In some embodiments, the detergent is selected from one of Tween 80 (polysorbate 80) and Triton X-100 (t-Oct-$C_6H_4$—$(OCH_2CH_2)xOH$, x=9-10). The Tween 80 and Triton X-100 both are nonionic surfactants, which can remove the dust and fine particles attached to a surface of an object, and can also wet the surface of particles and reduce the adhesion between particles and a surface to make the particles easily rinsed off.

S102: The dried PE material is shredded to produce a shredded PE material with a side length and a diameter of less than 2 mm. This step is convenient for the subsequent operations.

S103: The shredded PE material, a 1.2 mol/L dibutyl sebacate solution, and a 0.8 mol/L epoxidized polyether solution are thoroughly mixed and then fed into a hot-melt extrusion granulator for granulation to produce spherical-like PE waste particles. A mass of the dibutyl sebacate solution is 1.1% to 1.2% of a mass of the shredded PE material, and a mass of the epoxidized polyether solution is 0.8% to 1% of the mass of the shredded PE material. This step is intended to increase the repulsion force between shredded PE materials and prevent particles from approaching each other and aggregating.

Specifically, the hot-melt extrusion granulator has a barrel temperature of 160° C. to 180° C., a feeding speed and a screw speed of 80 rpm to 100 rpm, and a mesh plate size of 4 mm. The spherical-like PE waste particles are produced after the treatment is completed.

S104: The spherical-like PE waste particles are crushed into a PE waste powder with a particle size of 0.02 mm to 0.03 mm. A plastic grinder can be used to grind the spherical-like PE waste particles into the PE waste powder.

S2. Carbon fixation for a pumice to produce a carbon-fixed pumice: The pumice is placed in a carbon fixation machine, the carbon fixation machine is controlled at a carbon dioxide concentration of 15%, a carbon fixation pressure of 1.01 KPa, and a rotational speed of 120 r/min, and the carbon fixation is conducted for 3 h to produce the carbon-fixed pumice.

S3: Preparation of a powder-adsorbed pumice:

0.7 parts to 0.9 parts of a sodium silicate solution with a concentration of 1% is sprayed on a surface of 97 parts to 114 parts of the carbon-fixed pumice to produce a pretreated pumice. This step is intended to keep the carbon-fixed pumice in a wetted state.

6.5 parts to 7.5 parts of the PE waste powder were thoroughly mixed with 8.9 parts to 10.5 parts of a dispersant powder, followed by mixing with 97.7 parts to 114.9 parts of the pretreated pumice and treating in a gravity stirrer at a rotational speed of 120 r/min for 3 min to produce the powder-adsorbed pumice. The pretreated pumice with a wet surface is conducive to the adsorption of the PE waste powder and the dispersant powder.

In some embodiments, the dispersant powder has a particle size of 0.02 mm to 0.03 mm. A porosity of a film is controlled by controlling the particle size of the dispersant powder.

In some embodiments, the dispersant powder includes a kaolin powder and a talcum powder, and a mass ratio of the kaolin powder to the talcum powder is 1:1. The dispersant is added to disperse the PE waste powder, prevent the bonding, avoid the aggregation due to an electrostatic or wet state, and improve the performance of a PE product to some extent.

S4. High-temperature calcination to form a wire mesh shell skeleton:

S401: Preheating: The powder-adsorbed pumice is preheated at 120° C. to 130° C. for 3 min to 4 min.

S402: Melting: 2 min later, a pumice produced in the S401 is continuously heated at 150° C. to 170° C. for 4 min to 5 min to make a powder on a surface of the pumice melted.

S403: Formation of the wire mesh shell skeleton: 2 min later, a pumice produced in the S402 is continuously heated at 190° C. to 220° C. for 7 min to 9 min to form the wire mesh shell skeleton on a surface of the pumice.

S404: Cooling: A pumice with the wire mesh shell skeleton obtained in the S403 is air-cooled in an anaerobic environment for 20 min to produce the PE waste material-based carbon-fixed aggregate with the wire mesh shell.

Through the multi-stage temperature-controlled calcination, the PE waste powder is promoted to present a melted wire state, and a film skeleton of a single-layer "wire mesh structure" is formed under the flexible agglomeration of the micropowder.

Further, the PE material itself is hydrophobic. Thus, the carbon-fixed aggregate with a wire mesh shell produced after calcining the PE waste powder can be used to implement the one-way film flexible wrapping and embedding for the carbon-fixed aggregate to achieve the secondary carbon sequestration for the carbon-fixed pumice aggregate, thereby allowing the effective carbon fixation and improving the physical and chemical properties of the aggregate. On this basis, a protective effect of the hydrophobic flexible polymer wire mesh shell on the surface greatly improves a contact area with a surface of the pumice aggregate, increases the cohesion between a slurry and the aggregate during a hardening process of pervious concrete, greatly reduces the internal dynamic erosion for the aggregate after being exposed to water, and well optimizes the water erosion resistance of the aggregate, thereby improving the water erosion resistance and durability of pervious concrete.

The adsorption of agricultural waste PE materials such as waste mulch films and drip irrigation belts on the carbon-fixed pumice can improve the mechanical, physical, and chemical properties of the aggregate while locking a carbon sequestration effect for the pumice aggregate, especially in the improvement of water erosion resistance in seasonal freeze-thaw areas. Therefore, the present disclosure provides a green, eco-friendly, and high-durability aggregate system for the preparation and application of pervious concrete members in the seasonal freeze-thaw areas.

In some embodiments, when the PE waste material-based carbon-fixed aggregate with a wire mesh shell is prepared, the S1, the S3, and the S4 are repeated three times in total, and a multi-layer spatial wire mesh flexible film is formed through a plurality of adsorption treatments and multi-stage temperature-controlled calcination.

Of course, in order to form a dense wire mesh structure on a surface of the aggregate, the S4 can also be repeated multiple times to form wire mesh structures with different pores.

S5. Post-treatment: The PE waste material-based carbon-fixed aggregate with the wire mesh shell obtained in the S404 is cured for 28 d in a standard environment with a temperature of 20±2° C. and a humidity of 95% or more.

The present application provides the following examples. It should be noted that the "parts" in the examples refers to parts by mass.

Example 1

A preparation method of a PE waste material-based carbon-fixed aggregate with a wire mesh shell was provided in this example, including the following steps:

S1. Pretreatment of a PE material collected:
S101: 3.9 parts of a waste mulch film and 3 parts of a drip irrigation belt collected were cyclically rinsed with water, then cleaned with Tween 80 at a concentration of 1% for 25 min, and then dried to produce a dried PE material.
S102: The dried PE material was shredded to produce a shredded PE material with a side length and a diameter of less than 2 mm.
S103: 6.9 parts of the shredded PE material, 0.08 parts of a dibutyl sebacate solution with a concentration of 1.2 mol/L, and 0.06 parts of an epoxidized polyether solution with a concentration of 0.8 mol/L were thoroughly mixed and then fed into a hot-melt extrusion granulator. The hot-melt extrusion granulator was started and controlled at a barrel temperature of 170° C., a feeding speed and screw speed of 90 rpm, and a mesh plate size of 4 mm to conduct granulation to produce spherical-like PE waste particles.
S104: The spherical-like PE waste particles were crushed into a plastic powder with a particle size of 0.02 mm to 0.03 mm by a plastic grinder, so as to obtain 6.95 parts of a PE waste powder.

It should be noted that a particle size of the PE waste powder is set to 0.02 mm to 0.03 mm here because particle sizes of most of particles in the powder produced by the plastic grinder are in this range. In addition, the PE waste powder in the above particle size range can enable a prominent effect in the subsequent treatment. In order to make full use of the PE waste powder efficiently, the particle size of the PE waste powder is set to the above range.

S2. Carbon fixation for a pumice to produce a carbon-fixed pumice: 97 parts of the pumice were placed in a carbon fixation machine. The carbon fixation machine was controlled at a carbon dioxide concentration of 15%, a carbon fixation pressure of 1.01 KPa, and a rotational speed of 120 r/min. The carbon fixation was conducted for 3 h to produce the carbon-fixed pumice.

S3: Preparation of a powder-adsorbed pumice:
0.7 parts of a sodium silicate solution with a concentration of 1% was sprayed on a surface of 97 parts of the carbon-fixed pumice to produce a pretreated pumice. This step was intended to keep the carbon-fixed pumice in a wetted state.

6.95 parts of the PE waste powder were thoroughly mixed with 8.9 parts of a dispersant powder, followed by mixing with 97.7 parts of the pretreated pumice and treating in a gravity stirrer at a rotational speed of 120 r/min for 3 min to produce the powder-adsorbed pumice. The pretreated pumice with a wet surface was conducive to the adsorption of the PE waste powder and the dispersant powder.

The dispersant powder included 4.45 parts of a kaolin powder and 4.45 parts of a talcum powder.

S4. High-temperature calcination to form a wire mesh shell skeleton:
S401: Preheating: The powder-adsorbed pumice was preheated at 130° C. for 3 min.
S402: Melting: 2 min later, a pumice produced in the S401 was continuously heated at 160° C. for 4 min to make a powder on a surface of the pumice melted.
S403: Formation of the wire mesh shell skeleton: 2 min later, a pumice produced in the S402 was continuously heated at 200° C. for 8 min to form the wire mesh shell skeleton on a surface of the pumice.
S404: Cooling: A pumice with the wire mesh shell skeleton obtained in the S403 was air-cooled in an anaerobic environment for 20 min to produce the PE waste material-based carbon-fixed aggregate with the wire mesh shell.
S5. Post-treatment: The PE waste material-based carbon-fixed aggregate with the wire mesh shell obtained in the S404 was cured for 28 d under standard conditions (a temperature: 20±2° C., and a humidity: 95% or more).

Example 2

A preparation method of a PE waste material-based carbon-fixed aggregate with a wire mesh shell was provided in this example, including the following steps:

S1. Pretreatment of a PE material collected:
S101: 3.64 parts of a waste mulch film and 2.8 parts of a drip irrigation belt collected were cyclically rinsed with water, then cleaned with Tween 80 at a concentration of 1% for 25 min, and then dried to produce a dried PE material.
S102: The dried PE material was shredded to produce a shredded PE material with a side length and a diameter of less than 2 mm.
S103: 6.44 parts of the shredded PE material, 0.075 parts of a dibutyl sebacate solution with a concentration of 1.2 mol/L, and 0.06 parts of an epoxidized polyether solution with a concentration of 0.8 mol/L were thoroughly mixed and then fed into a hot-melt extrusion granulator. The hot-melt extrusion granulator was started and controlled at a barrel temperature of 170° C., a feeding speed and screw speed of 90 rpm, and a mesh plate size of 4 mm to conduct granulation to produce spherical-like PE waste particles.

S104: The spherical-like PE waste particles were crushed into a plastic powder with a particle size of 0.02 mm to 0.03 mm by a plastic grinder, so as to obtain 6.5 parts of a PE waste powder.

It should be noted that a particle size of the PE waste powder is set to 0.02 mm to 0.03 mm here because particle sizes of most of particles in the powder produced by the plastic grinder are in this range. In addition, the PE waste powder in the above particle size range can enable a prominent effect in the subsequent treatment. In order to make full use of the PE waste powder efficiently, the particle size of the PE waste powder is set to the above range.

S2. Carbon fixation for a pumice to produce a carbon-fixed pumice: 105 parts of the pumice were placed in a carbon fixation machine. The carbon fixation machine was controlled at a carbon dioxide concentration of 15%, a carbon fixation pressure of 1.01 KPa, and a rotational speed of 120 r/min. The carbon fixation was conducted for 3 h to produce the carbon-fixed pumice.

S3: Preparation of a powder-adsorbed pumice:

0.8 parts of a sodium silicate solution with a concentration of 1% was sprayed on a surface of 105 parts of the carbon-fixed pumice to produce a pretreated pumice. This step was intended to keep the carbon-fixed pumice in a wetted state.

6.5 parts of the PE waste powder were thoroughly mixed with 9.6 parts of a dispersant powder, followed by mixing with 105.8 parts of the pretreated pumice and treating in a gravity stirrer at a rotational speed of 120 r/min for 3 min to produce the powder-adsorbed pumice. The pretreated pumice with a wet surface was conducive to the adsorption of the PE waste powder and the dispersant powder.

The dispersant powder included 4.8 parts of a kaolin powder and 4.8 parts of a talcum powder.

S4. High-temperature calcination to form a wire mesh shell skeleton:

S401: Preheating: The powder-adsorbed pumice was preheated at 120° C. for 4 min.

S402: Melting: 2 min later, a pumice produced in the S401 was continuously heated at 170° C. for 5 min to make a powder on a surface of the pumice melted.

S403: Formation of the wire mesh shell skeleton: 2 min later, a pumice produced in the S402 was continuously heated at 220° C. for 7 min to form the wire mesh shell skeleton on a surface of the pumice.

S404: Cooling: A pumice with the wire mesh shell skeleton obtained in the S403 was air-cooled in an anaerobic environment for 20 min to produce the PE waste material-based carbon-fixed aggregate with the wire mesh shell.

S5. Post-treatment: The PE waste material-based carbon-fixed aggregate with the wire mesh shell obtained in the S404 was cured for 28 d under standard conditions (a temperature: 20±2° C., and a humidity: 95% or more).

Example 3

A preparation method of a PE waste material-based carbon-fixed aggregate with a wire mesh shell was provided in this example, including the following steps:

S1. Pretreatment of a PE material collected:

S101: 4.16 parts of a waste mulch film and 3.2 parts of a drip irrigation belt collected were cyclically rinsed with water, then cleaned with Triton X-100 at a concentration of 1% for 25 min, and then dried to produce a dried PE material.

S102: The dried PE material was shredded to produce a shredded PE material with a side length and a diameter of less than 2 mm.

S103: 7.36 parts of the shredded PE material, 0.085 parts of a dibutyl sebacate solution with a concentration of 1.2 mol/L, and 0.07 parts of an epoxidized polyether solution with a concentration of 0.8 mol/L were thoroughly mixed and then fed into a hot-melt extrusion granulator. The hot-melt extrusion granulator was started and controlled at a barrel temperature of 170° C., a feeding speed and screw speed of 90 rpm, and a mesh plate size of 4 mm to conduct granulation to produce spherical-like PE waste particles.

S104: The spherical-like PE waste particles were crushed into a plastic powder with a particle size of 0.02 mm to 0.03 mm by a plastic grinder, so as to obtain 7.5 parts of a PE waste powder.

It should be noted that a particle size of the PE waste powder is set to 0.02 mm to 0.03 mm here because particle sizes of most of particles in the powder produced by the plastic grinder are in this range. In addition, the PE waste powder in the above particle size range can enable a prominent effect in the subsequent treatment. In order to make full use of the PE waste powder efficiently, the particle size of the PE waste powder is set to the above range.

S2. Carbon fixation for a pumice to produce a carbon-fixed pumice: 114 parts of the pumice were placed in a carbon fixation machine. The carbon fixation machine was controlled at a carbon dioxide concentration of 15%, a carbon fixation pressure of 1.01 KPa, and a rotational speed of 120 r/min. The carbon fixation was conducted for 3 h to produce the carbon-fixed pumice.

S3: Preparation of a powder-adsorbed pumice:

0.9 parts of a sodium silicate solution with a concentration of 1% was sprayed on a surface of 114 parts of the carbon-fixed pumice to produce a pretreated pumice. This step was intended to keep the carbon-fixed pumice in a wetted state.

7.5 parts of the PE waste powder were thoroughly mixed with 10.5 parts of a dispersant powder, followed by mixing with 114.9 parts of the pretreated pumice and treating in a gravity stirrer at a rotational speed of 120 r/min for 3 min to produce the powder-adsorbed pumice. The pretreated pumice with a wet surface was conducive to the adsorption of the PE waste powder and the dispersant powder.

The dispersant powder included 5.25 parts of a kaolin powder and 5.25 parts of a talcum powder.

S4. High-temperature calcination to form a wire mesh shell skeleton:

S401: Preheating: The powder-adsorbed pumice was preheated at 125° C. for 3 min.

S402: Melting: 2 min later, a pumice produced in the S401 was continuously heated at 150° C. for 4 min to make a powder on a surface of the pumice melted.

S403: Formation of the wire mesh shell skeleton: 2 min later, a pumice produced in the S402 was continuously heated at 190° C. for 9 min to form the wire mesh shell skeleton on a surface of the pumice.

S404: Cooling: A pumice with the wire mesh shell skeleton obtained in the S403 was air-cooled in an anaerobic environment for 20 min to produce the PE waste material-based carbon-fixed aggregate with the wire mesh shell.

S5. Post-treatment: The PE waste material-based carbon-fixed aggregate with the wire mesh shell obtained in the S404 was cured for 28 d under standard conditions (a temperature: 20±2° C., and a humidity: 95% or more).

Example 4

A preparation method of a PE waste material-based carbon-fixed aggregate with a wire mesh shell was provided in this example, including the following steps:

S1. Pretreatment of a PE material collected:

S101: 3.9 parts of a waste mulch film and 3 parts of a drip irrigation belt collected were cyclically rinsed with water, then cleaned with Tween 80 at a concentration of 1% for 25 min, and then dried to produce a dried PE material.

S102: The dried PE material was shredded to produce a shredded PE material with a side length and a diameter of less than 2 mm.

S103: 6.9 parts of the shredded PE material, 0.08 parts of a dibutyl sebacate solution with a concentration of 1.2 mol/L, and 0.06 parts of an epoxidized polyether solution with a concentration of 0.8 mol/L were thoroughly mixed and then fed into a hot-melt extrusion granulator. The hot-melt extrusion granulator was started and controlled at a barrel temperature of 170° C., a feeding speed and screw speed of 90 rpm, and a mesh plate size of 4 mm to conduct granulation to produce spherical-like PE waste particles.

S104: The spherical-like PE waste particles were crushed into a plastic powder with a particle size of 0.02 mm to 0.03 mm by a plastic grinder, so as to obtain 6.95 parts of a PE waste powder.

It should be noted that a particle size of the PE waste powder is set to 0.02 mm to 0.03 mm here because particle sizes of most of particles in the powder produced by the plastic grinder are in this range. In addition, the PE waste powder in the above particle size range can enable a prominent effect in the subsequent treatment. In order to make full use of the PE waste powder efficiently, the particle size of the PE waste powder is set to the above range.

S2. Carbon fixation for a pumice to produce a carbon-fixed pumice: 97 parts of the pumice were placed in a carbon fixation machine. The carbon fixation machine was controlled at a carbon dioxide concentration of 15%, a carbon fixation pressure of 1.01 KPa, and a rotational speed of 120 r/min. The carbon fixation was conducted for 3 h to produce the carbon-fixed pumice.

S3: Preparation of a powder-adsorbed pumice:

0.7 parts of a sodium silicate solution with a concentration of 1% was sprayed on a surface of 97 parts of the carbon-fixed pumice to produce a pretreated pumice. This step was intended to keep the carbon-fixed pumice in a wetted state.

6.95 parts of the PE waste powder were thoroughly mixed with 8.9 parts of a dispersant powder, followed by mixing with 97.7 parts of the pretreated pumice and treating in a gravity stirrer at a rotational speed of 120 r/min for 3 min to produce the powder-adsorbed pumice. The pretreated pumice with a wet surface was conducive to the adsorption of the PE waste powder and the dispersant powder.

The dispersant powder included 4.45 parts of a kaolin powder and 4.45 parts of a talcum powder.

S4. High-temperature calcination to form a wire mesh shell skeleton:

S401: Preheating: The powder-adsorbed pumice was preheated at 130° C. for 3 min.

S402: Melting: 2 min later, a pumice produced in the S401 was continuously heated at 160° C. for 4 min to make a powder on a surface of the pumice melted.

S403: Formation of the wire mesh shell skeleton: 2 min later, a pumice produced in the S402 was continuously heated at 200° C. for 8 min to form the wire mesh shell skeleton on a surface of the pumice.

S404: Cooling: A pumice with the wire mesh shell skeleton obtained in the S403 was air-cooled in an anaerobic environment for 20 min to produce the PE waste material-based carbon-fixed aggregate with the wire mesh shell.

The S1, the S3, and the S4 were further repeated twice. That is, the carbon-fixed pumice was subjected to powder adsorption and high-temperature calcination three times in this example, such that the carbon-fixed pumice was wrapped and embedded with three wire mesh shell skeleton layers.

It should be noted that, when the S3 was implemented the second time, a carbon-fixed pumice was a pumice wrapped with a wire mesh shell skeleton layer produced after the S404 was implemented the first time, a concentration and spraying amount of the sodium silicate solution sprayed on a surface remained unchanged, and amounts of the PE waste powder and the dispersant powder used also remained unchanged. Similarly, when the S3 was implemented the third time, a carbon-fixed pumice was a pumice wrapped with two wire mesh shell skeleton layers produced after the S404 was implemented the second time, a concentration and spraying amount of the sodium silicate solution sprayed on a surface remained unchanged, and amounts of the PE waste powder and the dispersant powder used also remained unchanged.

S5. Post-treatment: The PE waste material-based carbon-fixed aggregate with a plurality of wire mesh shell layers obtained in the S404 was cured for 28 d under standard conditions (a temperature: 20±2° C., and a humidity: 95% or more).

Comparative Example 1

A preparation method of a carbon-fixed aggregate provided in this comparative example included merely the S2 and the S4 in Example 1.

Comparative Example 2

A preparation method of a carbon-fixed aggregate provided in this comparative example was the same as the preparation method in Example 1, except that, in the S4, only S401 was implemented, and the powder-adsorbed pumice was placed at 163° C. for 15 min.

Specifically, raw materials for preparing the carbon-fixed aggregates provided in Examples 1 to 4 and Comparative Examples 1 to 2 were shown in Table 1.

TABLE 1

| Group | Parts (parts by mass) | | | | | | | Whether there is repeated wrapping |
| --- | --- | --- | --- | --- | --- | --- | --- | --- |
| | Waste mulch film | Drip irrigation belt | Dibutyl sebacate solution | Epoxidized polyether solution | Carbon-fixed pumice | Sodium silicate solution | Dispersant | |
| Example 1 | 3.9 | 3 | 0.08 | 0.06 | 97 | 0.7 | 8.9 | No |
| Example 2 | 3.64 | 2.8 | 0.075 | 0.06 | 105 | 0.8 | 9.6 | No |
| Example 3 | 4.16 | 3.2 | 0.085 | 0.07 | 114 | 0.9 | 10.5 | No |
| Example 4 | 11.7 | 9 | 0.24 | 0.18 | 97 | 2.1 | 26.7 | Yes |
| Comparative Example 1 | 0 | 0 | 0 | 0 | 97 | 0 | 0 | No |
| Comparative Example 2 | 3.9 | 3 | 0.08 | 0.06 | 97 | 0.7 | 8.9 | No |

Further, the carbon-fixed aggregates prepared in Examples 1 to 4 and Comparative Examples 1 to 2 were subjected to performance tests. Test results were shown in Table 2.

TABLE 2

| Group | Apparent density (kg/m$^3$) | Water absorption rate (%) | Cylinder compressive strength (MPa) |
| --- | --- | --- | --- |
| Example 1 | 1836 | 3.8 | 3.0 |
| Example 2 | 1703 | 4.0 | 2.5 |
| Example 3 | 1725 | 4.5 | 2.7 |
| Example 4 | 1868 | 3.3 | 3.5 |
| Comparative Example 1 | 1683 | 4.7 | 2.4 |
| Comparative Example 2 | 1816 | 3.9 | 2.9 |

It can be known that, because a PE waste material is calcined to form a wire mesh shell on a pumice aggregate in Examples 1 to 4, Examples 1 to 4 have a higher apparent density, a lower water absorption rate, and a higher cylinder compressive strength than Comparative Example 1. In Example 4, the S4 is repeated three times to form three wire mesh shell layers on an outer surface of a pumice aggregate. Thus, Example 4 has a higher apparent density and cylinder compressive strength than Examples 1 to 3 and a lower water absorption rate than Examples 1 to 3. It can be expected that, if the S1, the S3, and the S4 are repeated multiple times, a carbon-fixed aggregate with a multi-layer wire mesh shell can be produced, and the water absorption rate will be further reduced.

The preparation method of a PE waste material-based carbon-fixed aggregate with a wire mesh shell provided in the present application allows the recovery and utilization of PE wastes such as waste mulch films and drip irrigation belts. PE wastes are adsorbed on a carbon-fixed pumice aggregate in a wetted state (it should be noted that the aggregate can be also not limited to a pumice, but can be a rock with a similar porous structure to a pumice), and subjected to a high-temperature anaerobic heating treatment to produce a novel aggregate system. In an adsorption process, the PE waste material and the dispersant are evenly and flexibly interlocked on the pumice under a synergistic action. The multi-stage temperature-controlled calcination promotes the PE waste material to present a melted wire state. A multi-layer spatial wire mesh flexible film is formed through a plurality of adsorption treatments and multi-stage temperature-controlled calcination under the flexible agglomeration of the micropowder.

The adsorption of agricultural waste PE materials such as waste mulch films and drip irrigation belts on the carbon-fixed pumice can improve the mechanical, physical, and chemical properties of the aggregate while locking a carbon sequestration effect for the pumice aggregate, especially in the improvement of water erosion resistance in seasonal freeze-thaw areas. Therefore, the present disclosure provides a green, eco-friendly, and high-durability aggregate system for the preparation and application of pervious concrete members in the seasonal freeze-thaw areas.

The present application also provides a PE waste material-based carbon-fixed aggregate with a wire mesh shell prepared by the preparation method of a PE waste material-based carbon-fixed aggregate with a wire mesh shell provided in any one of Examples 1 to 4.

Further, as shown in FIG. 2, a PE waste material-based carbon-fixed aggregate with a wire mesh shell prepared by the preparation method of the present application can be used to prepare a pervious concrete. The pervious concrete can be used in scenarios such as ecological slope protection, landscape greening, municipal sidewalks, and ecological agricultural landscape roads. Due to excellent permeability and hydrophobicity, the pervious concrete is suitable for permeable scenes, and can extent a service life while promoting the rapid infiltration of rainwater and reducing the surface runoff.

The above are only specific implementations of the present application, which allows those skilled in the art to understand or implement the present application. Various modifications to the examples are readily apparent to a person skilled in the art, and the generic principles defined herein may be practiced in other examples without departing from the spirit or scope of the present application. Thus, the present application is not limited to the examples shown herein, but falls within the widest scope consistent with the principles and novel features disclosed herein.

What is claimed is:

1. A preparation method of a polyethylene (PE) waste material-based carbon-fixed aggregate with a wire mesh shell, comprising the following steps:
   S1, pretreatment of a PE material collected:
   S101, rinsing the PE material with water and cleaning with a detergent, and drying a cleaned PE material to produce a dried PE material, wherein the PE material comprises a waste mulch film and a drip irrigation belt, and a mass ratio of the waste mulch film to the drip irrigation belt is 1.3:1;
   S102, shredding the dried PE material to produce a shredded PE material with a side length and a diameter of less than 2 mm;
   S103, mixing the shredded PE material with a 1.2 mol/L dibutyl sebacate solution and a 0.8 mol/L epoxidized polyether solution, and feeding into a hot-melt extrusion granulator for granulation to produce spherical-like PE waste particles, wherein a mass of the dibutyl sebacate solution is 1.1% to 1.2% of a mass of the shredded PE material, and a mass of the epoxidized polyether solution is 0.8% to 1% of the mass of the shredded PE material;

S104, crushing the spherical-like PE waste particles into a PE waste powder with a particle size of 0.02 mm to 0.03 mm;

S2, carbon fixation for a pumice to produce a carbon-fixed pumice: placing the pumice in a carbon fixation machine, controlling the carbon fixation machine at a carbon dioxide concentration of 15%, a carbon fixation pressure of 1.01 KPa, and a rotational speed of 120 r/min, and conducting the carbon fixation for 3 h to produce the carbon-fixed pumice;

S3, preparation of a powder-adsorbed pumice:

spraying 0.7 parts to 0.9 parts by weight of a sodium silicate solution with a concentration of 1% wt on a surface of 97 parts to 114 parts by weight of the carbon-fixed pumice to produce a pretreated pumice; and mixing 6.5 to 7.5 parts by weight of the PE waste powder with 8.9 to 10.5 parts by weight of a dispersant powder, and then mixing with 97.7 to 114.9 parts by weight of the pretreated pumice, and treating in a gravity stirrer at a rotational speed of 120 r/min for 3 min to produce the powder-adsorbed pumice;

S4, high-temperature calcination to form a wire mesh shell skeleton:

S401, preheating: preheating the powder-adsorbed pumice at 120° C. to 130° C. for 3 min to 4 min;

S402, melting: 2 min later, continuously heating a preheated pumice produced in the S401 at 150° C. to 170° C. for 4 min to 5 min to make a powder on a surface of the preheated pumice melted;

S403, formation of the wire mesh shell skeleton: 2 min later, continuously heating a heated pumice produced in the S402 at 190° C. to 220° C. for 7 min to 9 min to form the wire mesh shell skeleton on a surface of the heated pumice; and S404, cooling: air-cooling a pumice with the wire mesh shell skeleton obtained in the S403 in an anaerobic environment for 20 min to produce the PE waste material-based carbon-fixed aggregate with the wire mesh shell; and S5, post-treatment: curing the PE waste material-based carbon-fixed aggregate with the wire mesh shell obtained in the S404 for 28 d under standard conditions, wherein the standard conditions are as follows: a temperature: 20±2° C., and a humidity: 95% or more.

2. The preparation method of the PE waste material-based carbon-fixed aggregate with the wire mesh shell according to claim 1, wherein
in the S101, the detergent is selected from one of polysorbate 80 or t-Oct-$C_6H_4$—$(OCH_2CH_2)xOH$, x=9-10.

3. The preparation method of the PE waste material-based carbon-fixed aggregate with the wire mesh shell according to claim 1, wherein
in the S103, the hot-melt extrusion granulator has a barrel temperature of 160° C. to 180° C., a feeding speed and a screw speed of 80 rpm to 100 rpm, and a mesh plate size of 4 mm.

4. The preparation method of the PE waste material-based carbon-fixed aggregate with the wire mesh shell according to claim 1, wherein
in the S3, the dispersant powder has a particle size of 0.02 mm to 0.03 mm.

5. The preparation method of the PE waste material-based carbon-fixed aggregate with the wire mesh shell according to claim 4, wherein
in the S3, the dispersant powder comprises a kaolin powder and a talcum powder, and a mass ratio of the kaolin powder to the talcum powder is 1:1.

6. The preparation method of the PE waste material-based carbon-fixed aggregate with the wire mesh shell according to claim 1, wherein
in the S3, the dispersant powder comprises a kaolin powder and a talcum powder, and a mass ratio of the kaolin powder to the talcum powder is 1:1.

7. The preparation method of the PE waste material-based carbon-fixed aggregate with the wire mesh shell according to claim 1, further comprising:
repeating the S1, the S3, and the S4 three times in total.

* * * * *